US010355535B2

(12) United States Patent
Stoufer et al.

(10) Patent No.: US 10,355,535 B2
(45) Date of Patent: Jul. 16, 2019

(54) APPLIANCE FOR WIRELESS POWER AND DATA TRANSFER (71) Applicant: ELECTROLUX HOME PRODUCTS, INC., Charlotte, NC (US)

(72) Inventors: Paul Stoufer, Lincolnton, NC (US); Thomas Josefsson, Concord, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 566 days.

(21) Appl. No.: 15/089,031

(22) Filed: Apr. 1, 2016

(65) Prior Publication Data

US 2017/0288472 A1 Oct. 5, 2017

(51) Int. Cl.
*H02J 50/80* (2016.01)
*H04B 5/00* (2006.01)
*H02J 50/00* (2016.01)

(52) U.S. Cl.
CPC .............. *H02J 50/80* (2016.02); *H02J 50/00* (2016.02); *H04B 5/0031* (2013.01); *H04B 5/0037* (2013.01)

(58) Field of Classification Search
CPC ........ H02J 50/80; H02J 50/00; H04B 5/0031; H04B 5/0037
USPC ......................................................... 307/104
See application file for complete search history.

(56) References Cited

U.S. PATENT DOCUMENTS 6,671,496 B1 * 12/2003 Hoshi .................. H04B 7/0608
333/101
2002/0027928 A1 * 3/2002 Fang ..................... H04J 3/1682
370/468
2002/0051465 A1 * 5/2002 Fang ........................ H04L 69/18
370/470
2007/0239356 A1 * 10/2007 Woz .......................... G04R 20/02
701/478
2011/0156640 A1 * 6/2011 Moshfeghi .............. H02J 50/20
320/108
2012/0116479 A1 * 5/2012 Meskins ............ A61N 1/37217
607/57
2013/0043835 A1 * 2/2013 Yoon .................... H04B 5/0037
320/108
2013/0100966 A1 * 4/2013 Huang ..................... H04B 3/54
370/503
2013/0322348 A1 * 12/2013 Julian ..................... H04L 5/003
370/329
2014/0179226 A1 * 6/2014 Witschnig ............ H04B 5/0031
455/41.1
2014/0184422 A1 * 7/2014 Mensinger ........... A61B 5/0004
340/870.02

(Continued)

FOREIGN PATENT DOCUMENTS

WO WO 2010030767 A1 * 3/2010 .............. H02J 17/00

*Primary Examiner* — Daniel Kessie
*Assistant Examiner* — Swarna N Chowdhuri
(74) *Attorney, Agent, or Firm* — Womble Bond Dickinson (US) LLP (57) ABSTRACT An apparatus is provided that includes a power transmitter, data receiver, and an antenna operatively coupled to the power transmitter and data receiver. The antenna being configured to switchably transmit energy from the power transmitter to power a sensor, and receive data to the data receiver from the sensor in which a frequency being used by the antenna is the same for both transmission of the energy and reception of the data.

20 Claims, 5 Drawing Sheets (56) References Cited

U.S. PATENT DOCUMENTS

2014/0312709 A1* 10/2014 Nakano .................. H02J 5/005
 307/104
2016/0329931 A1* 11/2016 Mukherjee ........... H04B 5/0012
2017/0141621 A1* 5/2017 Zeine ...................... H02J 50/20

* cited by examiner

APPLIANCE FOR WIRELESS POWER AND DATA TRANSFER

TECHNOLOGICAL FIELD

The present disclosure relates generally to appliances and, in particular, to an appliance configured for wireless power and data transfer.

BACKGROUND

Modern appliances may include appropriate components that provide for controlling and/or operating the appliance. In recent years, advancements and continued developments have been made for implementing sensor technology within appliances including the use of energy harvesting techniques for powering an appliance sensor. Energy harvesting enables the implementation of wireless sensors that may operate within extreme temperature environments including substantially hot and/or cold environments (e.g., an oven, freezer, or the like). This occurs as a result of eliminating the requirement of a stand-alone power source (e.g., a battery) which may include temperature sensitive components. Some sensors, powered via energy harvesting, utilize separate and distinct frequencies for power and data transmission which requires two corresponding transmitters and antennas on each end of the communication. Other sensors, powered via energy harvesting, utilize amplitude or frequency modulation for power and data transmission which may include complex and expensive circuitry that may require intricate testing and certification.

Therefore, it may be desirable to have an appliance and method that take into account at least some of the issues discussed above, as well as possibly other issues.

BRIEF SUMMARY

Example implementations of the present disclosure provide an improved apparatus and method for controlling an apparatus with improved usability and user-friendliness, and which may implement intuitive control configurations. The present disclosure includes, without limitation, the following example implementations:

Example Implementation 1

An apparatus comprising a power transmitter, a data receiver, and an antenna operatively coupled to the power transmitter and data receiver. The antenna being configured to switchably transmit energy from the power transmitter to power a sensor, and receive data to the data receiver from the sensor in which a frequency being used by the antenna is the same for both transmission of the energy and reception of the data.

Example Implementation 2

The apparatus of the preceding or subsequent example implementation, or combinations thereof, wherein the antenna being configured to switchably transmit energy and receive data includes being configured to switchably transmit energy and receive data according to a time-division multiplexing (TDM) scheme.

Example Implementation 3

The apparatus of any preceding or subsequent example implementation, or combinations thereof, wherein the frequency being used by the antenna is a fixed frequency, and the antenna being configured to transmit energy includes configured to transmit energy such that the energy oscillates between the antenna and sensor at the fixed frequency.

Example Implementation 4

The apparatus of any preceding or subsequent example implementation, or combinations thereof, further comprising a control unit operatively coupled to the power transmitter and data receiver, and configured to increase a rate of transmission of the energy from the power transmitter after a predetermined period of time has elapsed without data being received to the data receiver.

Example Implementation 5

The apparatus of any preceding or subsequent example implementation, or combinations thereof, wherein the predetermined period of time defines a data transmission period, and the control unit being configured to increase the rate of transmission of the energy from the power transmitter includes being configured to calculate an increased power transmission duty cycle after the data transmission period for a subsequent data transmission period.

Example Implementation 6

The apparatus of any preceding or subsequent example implementation, or combinations thereof, further comprising a control unit operatively coupled to the antenna and configured to switchably couple the antenna to the power transmitter for transmission of energy, or the data receiver for receipt of data.

Example Implementation 7

The apparatus of any preceding or subsequent example implementation, or combinations thereof, wherein the control unit being configured to switchably couple the antenna includes being configured to automatically switch the antenna from the data receiver to the power transmitter after a predetermined period of time has elapsed without data being received to the data receiver.

Example Implementation 8

The apparatus of any preceding or subsequent example implementation, or combinations thereof, wherein the antenna being configured to receive data includes the antenna being configured to receive an asynchronous data transmission, and the data receiver being configured to receive the asynchronous data transmission from the antenna.

Example Implementation 9

The apparatus of any preceding or subsequent example implementation, or combinations thereof, wherein the data receiver being configured to receive the asynchronous data transmission includes being configured to identify a start bit of the asynchronous data transmission and thereby detect initiation of the asynchronous data transmission.

Example Implementation 10

The apparatus of any preceding or subsequent example implementation, or combinations thereof, wherein the data receiver being configured to receive the asynchronous data transmission includes being configured to identify a stop bit within the asynchronous data transmission and thereby detect a completion of the asynchronous data transmission, and in response thereto, the control unit is configured to switch the antenna from the data receiver to the power transmitter.

Example Implementation 11

The apparatus of any preceding or subsequent example implementation, or combinations thereof, further comprising a data transmitter operatively coupled to the antenna further configured to switchably transmit data from the data transmitter to the sensor, the frequency being used by the antenna that is also the same for transmission of the data.

Example Implementation 12

A method for controlling an apparatus comprising an antenna operatively coupled to a power transmitter and data receiver. The method comprising, at the antenna, transmitting energy from the power transmitter to power a sensor, and receiving data to the data receiver from the sensor. In which transmitting energy and receiving data includes switchably transmitting energy and receiving data, and a frequency being used by the antenna is the same for both transmission of the energy and reception of the data.

Example Implementation 13

The method of the preceding or subsequent example implementation, or combinations thereof, wherein switchably transmitting energy and receiving data includes switchably transmitting energy and receiving data according to a time-division multiplexing (TDM) scheme.

Example Implementation 14

The method of any preceding or subsequent example implementation, or combinations thereof, wherein the frequency being used by the antenna is a fixed frequency, and transmitting energy includes transmitting energy such that the energy oscillates between the antenna and sensor at the fixed frequency.

Example Implementation 15

The method of any preceding or subsequent example implementation, or combinations thereof, wherein the apparatus further comprises a control unit operatively coupled to the power transmitter and data receiver, and the method further comprises, at the control unit, increasing a rate of transmission of the energy from the power transmitter after a predetermined period of time has elapsed without data being received to the data receiver.

Example Implementation 16

The method of any preceding or subsequent example implementation, or combinations thereof, wherein the predetermined period of time defines a data transmission period, and increasing the rate of transmission of the energy from the power transmitter includes calculating an increased power transmission duty cycle after the data transmission cycle for a subsequent data transmission period.

Example Implementation 17

The method of any preceding or subsequent example implementation, or combinations thereof, wherein the apparatus further comprises a control unit operatively coupled to the antenna, and the method further comprises, at the control unit, switchably coupling the antenna to the power transmitter for transmission of energy, or the data receiver for receipt of data.

Example Implementation 18

The method of any preceding or subsequent example implementation, or combinations thereof, wherein switchably coupling the antenna includes automatically switching the antenna from the data receiver to the power transmitter after a predetermined period of time has elapsed without data being received to the data receiver.

Example Implementation 19

The method of any preceding or subsequent example implementation, or combinations thereof, wherein the antenna receiving data includes the antenna receiving an asynchronous data transmission, and the data receiver receiving the asynchronous data transmission from the antenna.

Example Implementation 20

The method of any preceding or subsequent example implementation, or combinations thereof, wherein receiving the asynchronous data transmission at the data receiver includes identifying a start bit of the asynchronous data transmission and thereby detecting initiation of the asynchronous data transmission.

Example Implementation 21

The method of any preceding or subsequent example implementation, or combinations thereof, wherein the apparatus further comprises a control unit operatively coupled to the antenna, and receiving the asynchronous data transmission at the data receiver includes identifying, at the data receiver, a stop bit within the asynchronous data transmission and thereby detecting a completion of the asynchronous data transmission; and in response thereto, switching, at the control unit, the antenna from the data receiver to the power transmitter.

Example Implementation 22

The method of any preceding or subsequent example implementation, or combinations thereof, wherein the apparatus further comprises a data operatively coupled to the antenna, and the method further comprises switchably transmitting data from the data transmitter to the sensor, the frequency being used by the antenna that is also the same for transmission of the data.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific implementation description herein. This disclosure is intended to be read holistically such that any separable features or elements of the disclosure, in any of its aspects and implementations, should be viewed as intended, namely to be combinable, unless the context of the disclosure clearly dictates otherwise.

It will therefore be appreciated that the above Summary is provided merely for purposes of summarizing some example implementations so as to provide a basic understanding of some aspects of the disclosure. As such, it will be appreciated that the above described example implementations are merely examples of some implementations and should not be construed to narrow the scope or spirit of the disclosure in any way. It will be appreciated that the scope of the disclosure encompasses many potential implementations, some of which will be further described below, in addition to those here summarized. Further, other aspects and advantages of implementations disclosed herein will become apparent from the following detailed description taken in conjunction with the accompanying drawings which illustrate, by way of example, the principles of the described implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

Figure 1:
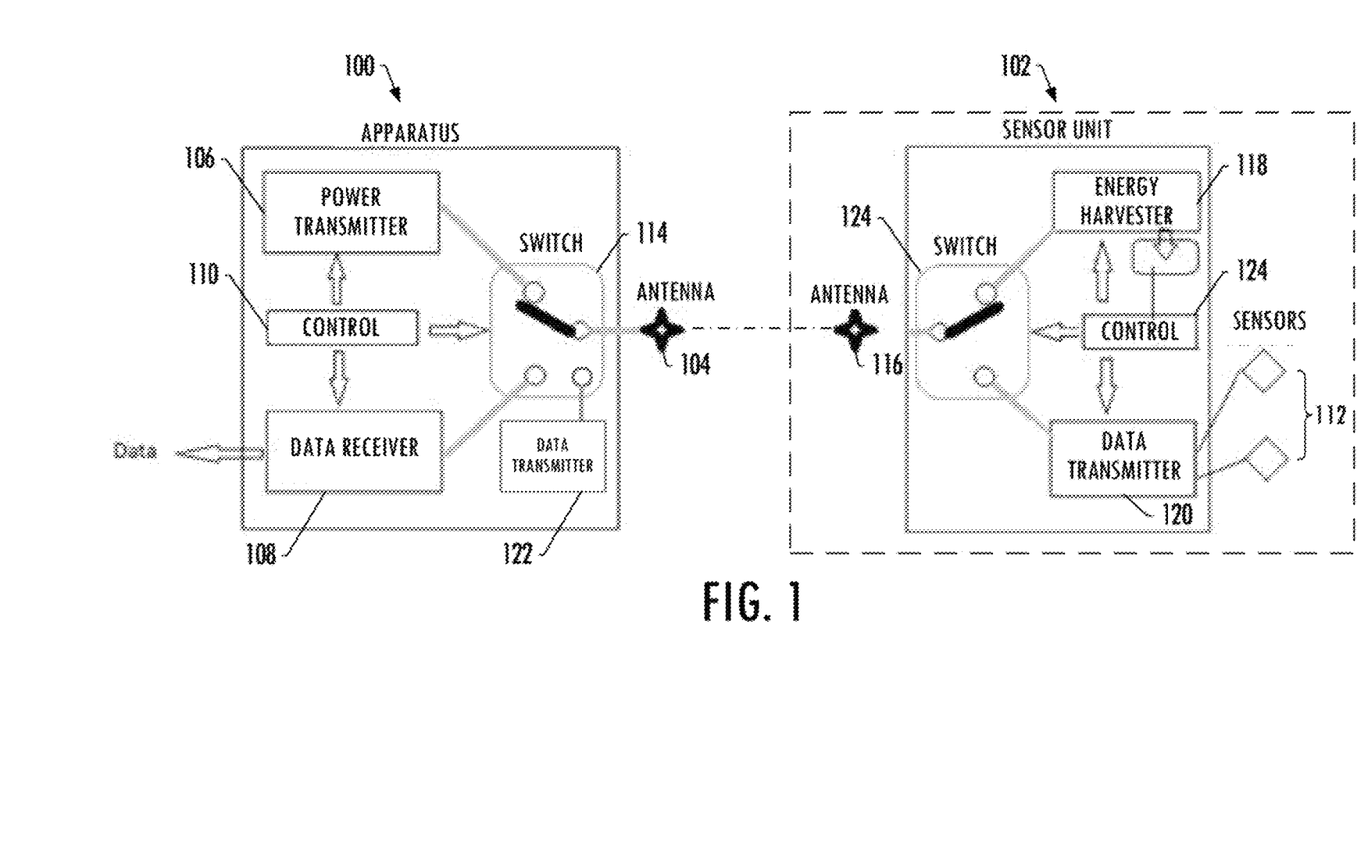
FIG. 1 is an illustration of an apparatus and sensor unit according to example implementations of the present disclosure.

FIG. 1 illustrates an apparatus 100, and a sensor unit 102 according to example implementations of the present disclosure. As shown, the apparatus may include an antenna 104 operatively coupled to a power transmitter 106 and data receiver 108. In some example implementations, the power transmitter and data receiver may include respectively a radio frequency (RF) power transmitter and RF data receiver. The apparatus may also include a control unit 110 operatively coupled to the antenna in which the antenna may be generally configured to operate under control of the control unit to switchably transmit energy from the power transmitter to power a sensor, and more particularly the sensor unit, and receive data to the data receiver from the sensor unit, or more particularly one or more sensors 112 of the sensor unit. The frequency being used by the antenna may be the same for both transmission of the energy and reception of the data.

Example implementations may be applicable to any of a number of different types of apparatuses 100. One example of a suitable type of apparatus is an appliance, such as any of a number of different types of major appliances (white goods), small appliances and the like. Examples of suitable appliances include dishwashers, washing machines, clothes dryers, refrigerators, freezers, ovens, ranges, cooktops, microwave ovens, trash compactors, air conditioners, vacuum cleaners, water heaters or the like.

In some examples in which the apparatus 100 is an appliance, the control unit 110 may be implemented by a control unit of the appliance for controlling various operations or components thereof. In these example implementations, the sensor(s) 112 of the sensor unit 102 may be or include a temperature sensor, humidity sensor, pressure sensor, turbidity sensor, or the like. For example, a temperature sensor may be utilized in either a cooling compartment of a refrigerator or housing for providing temperature regulation, a cooking chamber for detecting the temperature and restricting overheating, a washing machine for allowing control of water temperature, a clothes dryer for determining the temperature of hot air flowing into a drum of the dryer, or a steam generator for optimizing treatment of laundry. A humidity sensor may be utilized for detecting the dampness of laundry within a clothes dryer and thereby indicating a required drying time. A pressure sensor may be utilized in a washing machine for measuring a level of water in a drum of the washing machine. A turbidity sensor may be utilized for measuring the soiling of water within a clothes or dishwashing machine.

Even further, in example implementations in which the apparatus 100 is an appliance, the apparatus may also include a number of other components which may be coupled to and operate under control of the control unit 110 and generally configured to perform cleaning, cooking, information display, or environmental control operations. The type and number of the components of the apparatus may depend on the particular appliance, but may include pumps, valves, motors, heating elements and the like. For example, the components of a kitchen oven, range or food warmer may include one or more heating elements for heating a chamber of the appliance that may be accessible by a door, and one or more temperature sensors for measuring the temperature within the chamber. As another example, a laundry appliance (e.g., a washing or drying machine) may include a tub portion, supported within a housing, in which laundry may be placed for washing and/or drying. A washing or drying drum may be rotatably disposed within the tub portion of the respective washing and drying appliance for agitating or spinning the laundry during the washing or drying process. In another example, an environmental-control appliance such as a refrigerator, freezer, or air conditioner may include components configured to regulate temperature within a compartment of the appliance or another defined space within which the appliance is installed (e.g., one or more rooms of a building).

As shown in FIG. 1, the appliance 100 may also include a switch 114 operatively coupled to the antenna 104, and which the control unit may use to switchably couple the antenna to the power transmitter 106 for transmission of energy, or the data receiver 108 for receipt of data. In some examples, the control unit may periodically decouple the power transmitter from the antenna, thereby removing energy from the antenna and couple the antenna to the data receiver. After which, the data receiver may listen for data being transmitted from the sensor unit 102. In an instance in which a data transmission is detected, the data receiver may receive the data via the antenna and thereby store the data in memory.

In some example implementations, the control unit 110 may be configured to automatically switch the antenna 104 from the data receiver 108 to the power transmitter 106 after a predetermined period of time has elapsed without data being received to the data receiver. Similarly, in another example implementation, the control unit may be configured to automatically switch the antenna from the data receiver to the power transmitter after the data is received. After which, energy may reapplied to the antenna for transmission to the sensor unit 102.

Figure 2:
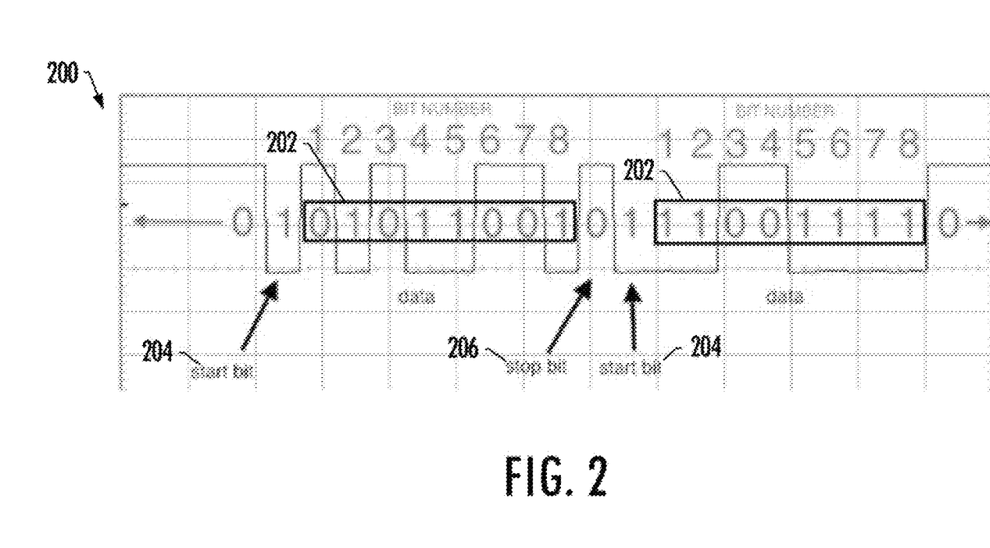
FIGS. 2-4 illustrate energy and data transmissions according to various example implementations.

FIG. 2 illustrates an asynchronous data transmission 200 that the antenna 104 may be configured to receive, and which the data receiver may receive from the antenna, according to example implementations of the present disclosure. As shown, the data transmission may utilize a data transmission scheme including n (e.g., 8) data bits 202 bounded by start and stop bits 204, 206.

In these example implementations, the data receiver 108 may be configured to identify the start bit 204 of the asynchronous data transmission 200 and thereby detect initiation of the asynchronous data transmission. Similarly, the data receiver may be configured to identify the stop bit 206 of the asynchronous data transmission and thereby detect completion of the asynchronous data transmission. In response to completion of the asynchronous data transmission, the control unit 110 may be configured to switch the antenna 102 from the data receiver to the power transmitter 106.

Returning to FIG. 1, in addition to the sensor(s) 112 and similar to the apparatus 100, the sensor unit 102 may include an antenna 116. The antenna of the sensor unit may be similar to that of the apparatus, but for corresponding opposing functionality. That is, while the antenna 104 of the apparatus may transmit energy and receive data, the antenna of the sensor unit may receive transmitted energy, and transmit data to the apparatus. The antenna of the sensor unit, then, may be operatively coupled to an energy harvesting device 118 and data transmitter 120. The data transmitter may also be coupled to the one or more sensors 112 of the sensor unit. In some example implementations, the data transmitter may be or include an RF data transmitter.

In some examples, the sensor unit 102 may also be configured to receive data from the apparatus 100. For example, in some implementations, the sensor unit 102 may periodically transmit a request for data to the apparatus, and in response thereto, the apparatus and more particularly the control unit 110 of the apparatus may transmit data to the sensor including but not limited to control data, calibration data, sensor selection data, and the like. For example, if multiple sensors 112 are utilized, the control unit may transmit a "sensor selection" message and as a result only the sensor so selected may transmit data to the apparatus until a different sensor is selected. The control unit of the apparatus may then disable the data transmission, and resume normal power and data transmission cycles. Bidirectional data transmission may enable the apparatus and sensor unit to negotiate information regarding the power transmission (e.g., percent duty cycle), data transmission (e.g., number of bytes per packet, data transmission rate (e.g., one packet per minute), reporting rates for various sensor inputs, and the like. Accordingly, the apparatus may include a data transmitter 122 operatively coupled to the antenna 114 in which the antenna may be configured to switchably transmit data from the data transmitter to the sensor unit, where the frequency being used by the antenna for transmission of the energy and reception of the data may also be the same for transmission of the data.

The sensor unit 102 may also include a control unit 124 operatively coupled to the antenna 116 in which the antenna may be generally configured to operate under control of the control unit to switchably receive the energy from the corresponding antenna 104 of the apparatus 100 to power the sensor unit, and transmit data to the corresponding antenna from the data transmitter. For example, the sensor unit may be or include a battery-less sensor (e.g., temperature sensor) wirelessly powered by energy generated by the power transmitter 106 of the apparatus, and thereby transmitted by the antenna 104 of the apparatus to the sensor unit. The control unit of the sensor unit may be similar to that of the apparatus, but for corresponding opposing functionality. That is, while the control unit 110 of the apparatus may operate to control operation of the apparatus, the control unit of the sensor unit may operate to control operation of the sensor unit.

As indicated above, according to example implementations, the antenna 104 of the apparatus 100 may be operatively coupled to the power transmitter 106 and data receiver 108. In some example implementations, the antenna 104 may be configured to switchably transmit energy and receive data according to a time-division multiplexing (TDM) scheme. As such, similar to the apparatus, the sensor unit 102 may also include a switch 124 operatively coupled to its respective antenna 116 and synchronized with the switch 114 of the apparatus for allowing the transmission and/or reception of both energy and data by the antennas 104, 116 using the same frequency.

Figure 3:
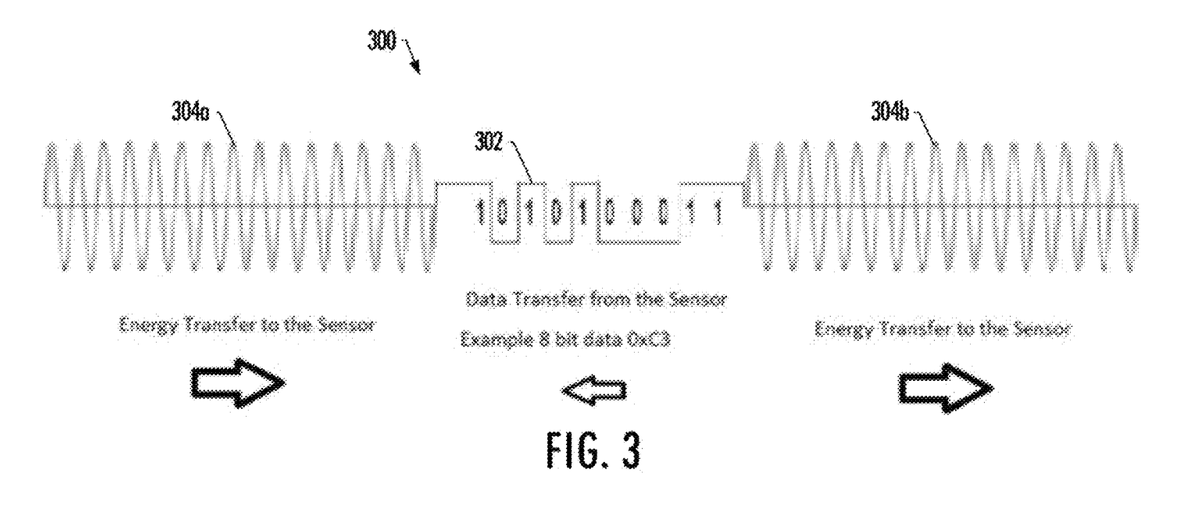

FIG. 3 illustrates a transfer of energy and receipt of data 300 by the antenna 104 using the same frequency according to example implementations of the present disclosure. As shown, the antenna may switchably transmit energy and receive data respectively to and from the sensor unit 102. For example, in one particular implementation, the antenna may receive one data transfer phase 302 bounded by two energy transfer phases 304a, 304b in which the data and energy transfer phases may use the same base frequency (e.g., 915 MHz).

Figure 4:
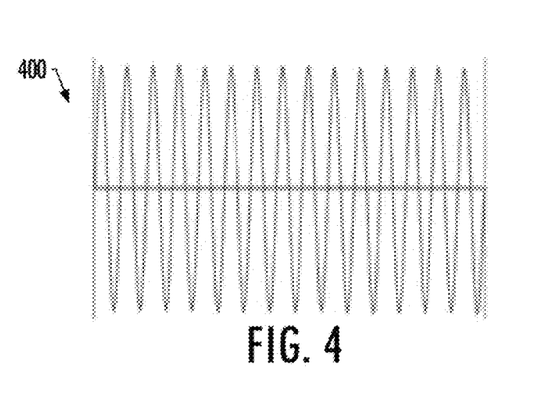

In some example implementations, the frequency being used by the antenna 104 is a fixed frequency. In these implementations, the antenna may be configured to transmit energy such that the energy oscillates between the antenna and sensor unit 102 at the fixed frequency. For example, the apparatus 100, and more particularly the power transmitter 106, may be configured to apply energy 400 to the antenna oscillating at a fixed frequency, as shown in FIG. 4. The energy may then be received and harvested by the sensor unit 102 using an energy harvesting device 118 having a resonant circuit or other suitable circuitry therein. In some examples, the energy harvesting device may be or include a suitable energy store such as a capacitor. The control unit 124 of the sensor unit may be configured to monitor the energy harvesting device for determining whether sufficient energy has been stored to power the sensor unit for transmitting data (e.g., temperature data, humidity data, and the like).

In some example implementations, in addition to the antenna 104, the control unit 110 is also operatively coupled to the power transmitter 106 and data receiver 108. In these example implementations, the control unit may be configured to cause an increase in the rate of transmission of the energy, from the power transmitter, after a predetermined period of time has elapsed without data being received to the data receiver. For example, the control unit may control the power transmitter to increase a time percentage of power transmission for supplying more energy to the sensor unit 102 in the event that no data is being received. In these example implementations, the predetermined period of time may define a data transmission period, and the control unit being configured to increase the rate of transmission of the energy from the power transmitter may include being configured to calculate an increased power transmission duty cycle after the data transmission period for a subsequent data transmission period.

In some example implementations, the rate of energy transmission may be calculated and updated continually for determining an optimal data transfer rate. For example, if no data is received from the sensor unit 102, the control unit 110 may determine that the sensor unit is not receiving substantial power for storage and data transmission. The control unit may then determine to increase the power transmission rate such as an increase of 25%. After the duration of one or more power transmission cycles, the control unit may proceed to determine whether or not data has been received from the sensor unit and, in an instance that no data has been received, continue increasing the power transmission rate.

In another example, the sensor unit 102 may transmit data to the control unit 110 regarding the onboard power of the sensor unit including a voltage of the stored energy which may correspond to an amount of data that may be sent to the control unit. In instances in which the voltage value is low, the power transmission rate may be increased. In instances in which the value is high, the power transmission rate may be decreased to reduce the occurrence of wasted energy. Data indicating parameters of the currently stored energy may be periodically transmitted to the control unit for continual adjustment of the power transmission rate, as needed.

Figure 5:
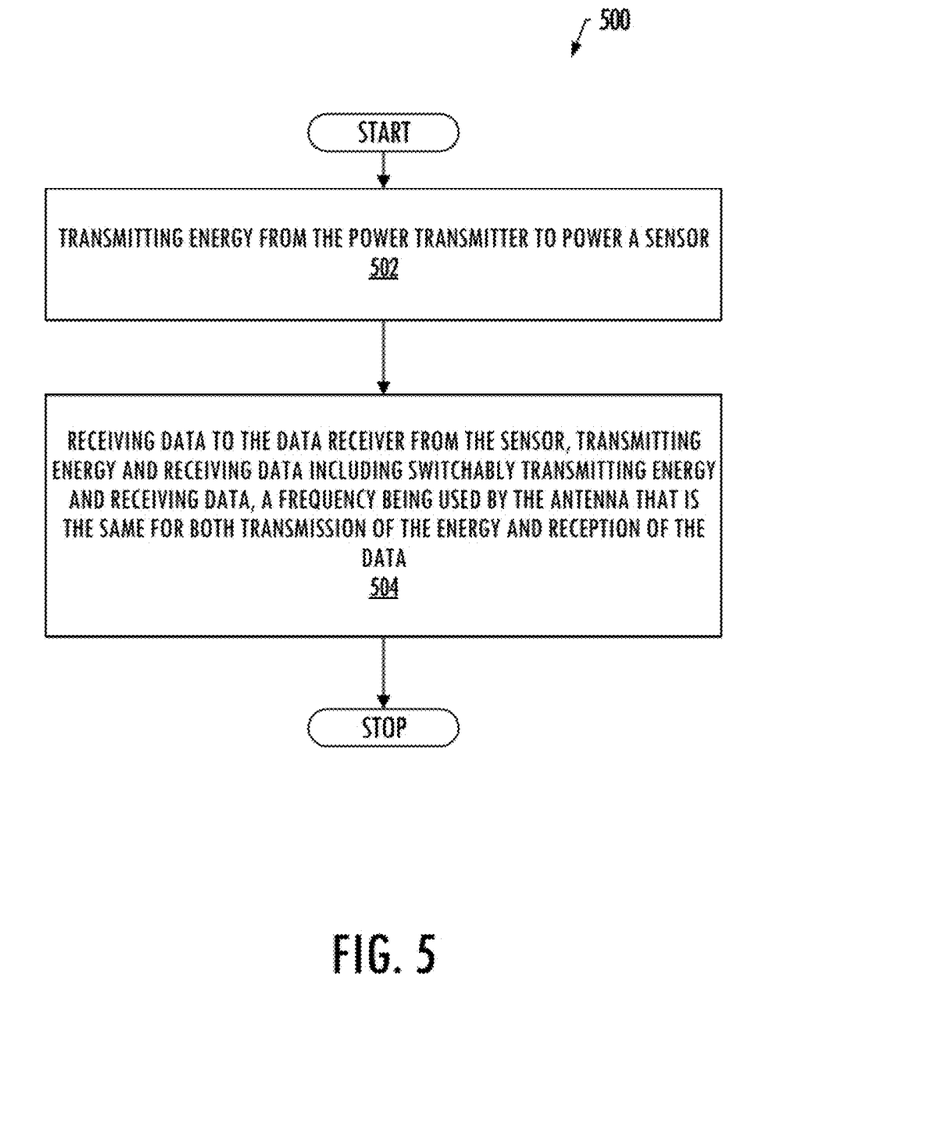
FIG. 5 is a flow diagram illustrating various operations in a method of controlling an apparatus, in accordance with an example implementation.

FIG. 5 is a flowchart illustrating various steps in a method 500 of controlling an apparatus, according to some example implementations of the present disclosure. The apparatus may comprise an antenna operatively coupled to a power transmitter and data receiver. As shown at block 502, the method may include transmitting energy from the power transmitter to power a sensor. The method may also include receiving data to the data receiver from the sensor. In which transmitting energy and receiving data includes switchably transmitting energy and receiving data, where the same frequency is used by the antenna for both transmission of the energy and reception of the data, as shown at block 504.

According to example implementations of the present disclosure, the apparatus 100 and sensor unit 102 and their respective components may be implemented by various means. Examples of suitable means include hardware, alone or under direction of one or more computer program code instructions, program instructions or executable computer-readable program code instructions from a computer-readable storage medium.

Figure 6:
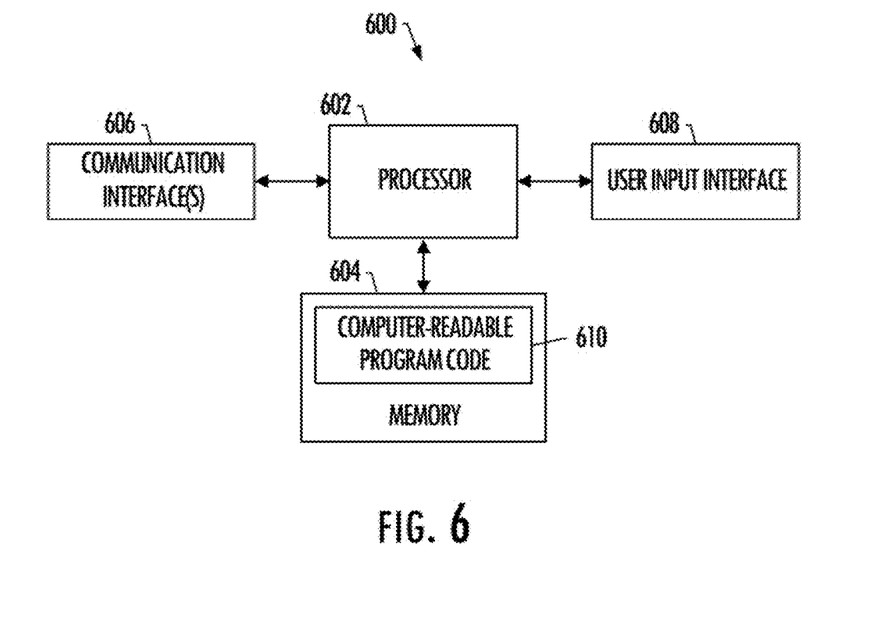
FIG. 6 illustrates a control unit according to some example implementations.

FIG. 6 illustrates a control unit 600 according to some example implementations of the present disclosure. In some examples, the control unit may be configured to implement the control units 110, 122 respectively of the apparatus 100 and sensor unit 102, or functionality thereof. As shown, the control unit may include one or more of each of a number of components such as, for example, a processor 602 connected to a memory 604.

The processor 602 may generally be any piece of computer hardware that is capable of processing information such as, for example, data, computer-readable program code, instructions or the like (at times generally referred to as "computer programs," e.g., software, firmware, etc.), and/or other suitable electronic information which may be stored in memory. The processor may be composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory.

The processor 602 may be a number of processors, a multi-processor core or some other type of processor, depending on the particular implementation. Further, the processor may be implemented using a number of heterogeneous processor systems in which a main processor is present with one or more secondary processors on a single chip. The processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 604 may generally be any piece of computer hardware that is capable of storing information such as, for example, data, computer programs (e.g., computer-readable program code) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition, the processor 604 may be connected to one or more interfaces for transmitting, receiving information, and/or displaying information, which may be coupled to and operate under control of the processor. The interfaces may include a communication interface 606 or one or more user interfaces 608. The user interface may include a display and/or one or more user input interfaces. The communications interface may be configured to transmit and/or receive information, such as to and/or from other apparatus(es), network(s) or the like. The communications interface may be configured to transmit and/or receive information by physical (wired) and/or wireless communications links. The antennas 104, 116 respectively of the apparatus 100 and sensor unit 102 may be examples of suitable communication interfaces or components thereof.

As indicated above, program code instructions 610 may be stored in memory 604, and executed by a processor, to implement functions described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions 610 may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, a control unit 600 may include a processor 602 and a computer-readable storage medium or memory 604 coupled to the processor, where the processor is configured to execute computer-readable program code 610 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
  a power transmitter;
  a data receiver; and
  an antenna operatively coupled to the power transmitter and data receiver, and configured to switchably transmit energy from the power transmitter to power a sensor, and receive data to the data receiver from the sensor according to a time-division multiplexing (TDM) scheme to synchronize a switch of the apparatus with a switch of the sensor so that a frequency being used by the antenna is the same for both transmission of the energy and reception of the data.

2. The apparatus of claim 1, wherein the frequency being used by the antenna is a fixed frequency, and the antenna being configured to transmit energy includes configured to transmit energy such that the energy oscillates between the antenna and sensor at the fixed frequency.

3. The apparatus of claim 1 further comprising a control unit operatively coupled to the power transmitter and data receiver, and configured to increase a rate of transmission of the energy from the power transmitter after a predetermined period of time has elapsed without data being received to the data receiver.

4. The apparatus of claim 3, wherein the predetermined period of time defines a data transmission period, and the control unit being configured to increase the rate of transmission of the energy from the power transmitter includes being configured to calculate an increased power transmission duty cycle after the data transmission period for a subsequent data transmission period.

5. The apparatus of claim 1 further comprising a control unit operatively coupled to the antenna and configured to switchably couple the antenna to the power transmitter for transmission of energy, or the data receiver for receipt of data.

6. The apparatus of claim 5, wherein the control unit being configured to switchably couple the antenna includes being configured to automatically switch the antenna from the data receiver to the power transmitter after a predetermined period of time has elapsed without data being received to the data receiver.

7. The apparatus of claim 1, wherein the antenna being configured to receive data includes the antenna being configured to receive an asynchronous data transmission, and the data receiver being configured to receive the asynchronous data transmission from the antenna.

8. The apparatus of claim 7, wherein the data receiver being configured to receive the asynchronous data transmission includes being configured to identify a start bit of the asynchronous data transmission and thereby detect initiation of the asynchronous data transmission.

9. The apparatus of claim 7, wherein the data receiver being configured to receive the asynchronous data transmission includes being configured to identify a stop bit within the asynchronous data transmission and thereby detect a completion of the asynchronous data transmission, and in response thereto, the control unit is configured to switch the antenna from the data receiver to the power transmitter.

10. The apparatus of claim 1 further comprising:
  a data transmitter operatively coupled to the antenna further configured to switchably transmit data from the data transmitter to the sensor, the frequency being used by the antenna that is also the same for transmission of the data.

11. A method for controlling an apparatus comprising an antenna operatively coupled to a power transmitter and data receiver, the method comprising at the antenna:
   transmitting energy from the power transmitter to power a sensor; and
   receiving data to the data receiver from the sensor, transmitting energy and receiving data including switchably transmitting energy and receiving data according to a time-division multiplexing (TDM) scheme to synchronize a switch of the apparatus with a switch of the sensor so that a frequency being used by the antenna is the same for both transmission of the energy and reception of the data.

12. The method of claim 11, wherein the frequency being used by the antenna is a fixed frequency, and transmitting energy includes transmitting energy such that the energy oscillates between the antenna and sensor at the fixed frequency.

13. The method of claim 11, wherein the apparatus further comprises a control unit operatively coupled to the power transmitter and data receiver, and the method further comprises, at the control unit, increasing a rate of transmission of the energy from the power transmitter after a predetermined period of time has elapsed without data being received to the data receiver.

14. The method of claim 11, wherein the predetermined period of time defines a data transmission period, and increasing the rate of transmission of the energy from the power transmitter includes calculating an increased power transmission duty cycle after the data transmission cycle for a subsequent data transmission period.

15. The method of claim 11, wherein the apparatus further comprises a control unit operatively coupled to the antenna, and the method further comprises, at the control unit, switchably coupling the antenna to the power transmitter for transmission of energy, or the data receiver for receipt of data.

16. The method of claim 15, wherein switchably coupling the antenna includes automatically switching the antenna from the data receiver to the power transmitter after a predetermined period of time has elapsed without data being received to the data receiver.

17. The method of claim 11, wherein the antenna receiving data includes the antenna receiving an asynchronous data transmission, and the data receiver receiving the asynchronous data transmission from the antenna.

18. The method of claim 17, wherein receiving the asynchronous data transmission at the data receiver includes identifying a start bit of the asynchronous data transmission and thereby detecting initiation of the asynchronous data transmission.

19. The method of claim 17, wherein the apparatus further comprises a control unit operatively coupled to the antenna, and receiving the asynchronous data transmission at the data receiver includes:
   identifying, at the data receiver, a stop bit within the asynchronous data transmission and thereby detecting a completion of the asynchronous data transmission; and in response thereto,
   switching, at the control unit, the antenna from the data receiver to the power transmitter.

20. The method of claim 11, wherein the apparatus further comprises a data operatively coupled to the antenna, and the method further comprises switchably transmitting data from the data transmitter to the sensor, the frequency being used by the antenna that is also the same for transmission of the data.

* * * * *